US010360408B1

(12) United States Patent
Kincaid et al.

(10) Patent No.: US 10,360,408 B1
(45) Date of Patent: Jul. 23, 2019

(54) METHOD AND SYSTEM FOR COMPUTER SELF-DETERMINATION OF SECURITY PROTOCOL COMPLIANCE

(71) Applicant: SecureStrux, LLC, Arlington, VA (US)

(72) Inventors: Roy McLain Kincaid, Shepherdstown, WV (US); Michelle Marie Maitland, Grove City, OH (US)

(73) Assignee: SecureStrux, LLC, Lancaster, PA (US)

( * ) Notice: Subject to any disclaimer, the term of this patent is extended or adjusted under 35 U.S.C. 154(b) by 228 days.

(21) Appl. No.: 15/363,085

(22) Filed: Nov. 29, 2016

Related U.S. Application Data

(60) Provisional application No. 62/380,895, filed on Aug. 29, 2016.

(51) Int. Cl.
*G06F 21/57* (2013.01)
*G06F 21/62* (2013.01)

(52) U.S. Cl.
CPC .......... *G06F 21/6281* (2013.01); *G06F 21/57* (2013.01)

(58) Field of Classification Search
None
See application file for complete search history.

(56) References Cited

U.S. PATENT DOCUMENTS

| | | | |
|---|---|---|---|
| 6,669,325 B2 | 12/2003 | Fredrickson et al. | |
| 7,299,796 B2 | 11/2007 | Kirwan | |
| 8,661,534 B2* | 2/2014 | Chatterjee | G06F 21/577 713/166 |
| 8,813,235 B2 | 8/2014 | Sidagni | |
| 2002/0176543 A1* | 11/2002 | Creamer | H04M 3/2263 379/10.02 |
| 2003/0014557 A1* | 1/2003 | Berger | G06F 17/3092 719/318 |
| 2003/0023856 A1* | 1/2003 | Horne | G06F 11/3624 713/187 |
| 2005/0015176 A1* | 1/2005 | Harada | G05B 19/41845 700/121 |
| 2005/0021876 A1* | 1/2005 | Asai | G06F 9/50 710/1 |
| 2005/0232192 A1* | 10/2005 | Rawson, III | G06F 1/3203 370/329 |

(Continued)

*Primary Examiner* — Malcolm Cribbs
(74) *Attorney, Agent, or Firm* — McCracken & Gillen LLC

(57) ABSTRACT

A method and system for automating the evaluation of a computer system under a Software Security Guideline Set (SSGS) using the internal scripts and the script generating capability of the computer system under evaluation to perform much of the evaluation of the SSGS. The method and systems arranged in accordance therewith generate a security check script that adds automation to the otherwise laborious process of checking for compliance with an SSGS. By using the systems own software and script generating capabilities the computer system under review is in one sense using its own capability to check itself for compliance with an SSGS. The use of the software and data from the operating system of the computer system under review greatly simplifies the complexity of the programming necessary for such automation of SSGS compliance check, dramatically reducing the lines of code to perform such compliance evaluations. The information provided by this invention enables the owners of such systems to put them in a better state of operation.

19 Claims, 10 Drawing Sheets

(56) References Cited

U.S. PATENT DOCUMENTS

| | | | |
|---|---|---|---|
| 2010/0058291 A1* | 3/2010 | Hahn | G06F 8/70 717/113 |
| 2012/0254723 A1* | 10/2012 | Kasa | G06F 17/272 715/234 |
| 2013/0268538 A1 | 10/2013 | Nelson | |
| 2014/0068340 A1* | 3/2014 | Dayal | G06F 11/3672 714/38.1 |
| 2014/0222655 A1* | 8/2014 | Cummings | G06Q 30/0185 705/38 |
| 2015/0089300 A1* | 3/2015 | Tejerina | G06F 11/3476 714/45 |
| 2015/0186900 A1* | 7/2015 | Bubeck | G06Q 30/018 705/317 |
| 2015/0213268 A1* | 7/2015 | Nance | G06F 21/577 726/1 |
| 2015/0227868 A1* | 8/2015 | Saraf | G06Q 10/0635 705/7.28 |
| 2016/0012024 A1* | 1/2016 | Jayaraman | G06F 17/218 715/234 |
| 2016/0162349 A1* | 6/2016 | Edwards | H04L 43/08 714/19 |

\* cited by examiner

METHOD AND SYSTEM FOR COMPUTER SELF-DETERMINATION OF SECURITY PROTOCOL COMPLIANCE

CROSS REFERENCE TO RELATED APPLICATION

This application claims the benefit of U.S. Provisional Application 62/380,895 filed Aug. 29, 2016.

FIELD

The present invention relates generally to computer and software systems security. More particularly, this invention relates to the compliance status of a computer system with respect to security protocols.

BACKGROUND

As reliance on computers and computers systems in all aspects of daily life continually expands, so do the concerns about data security. Increasingly the public, government agencies and corporations call on those that generate data and hold data to insure its integrity and privacy. Many private and public organizations have issued standards and procedures to establish protocols that those entrusted with data need meet in order to receive, work with and retain the data of others. The growing prevalence of cloud based systems further heightens such concerns.

Government agencies are particularly concerned with data security and integrity. For example the US Department of Defense (DoD) issues directives for the Information Assurance (see DoDI 8500.01.) and presently directs that the Defense Information Systems Agency (DISA) "Develops and maintains control correlation identifiers (CCIs), security requirements guides (SRGs), security technical implementation guides (STIGs), and mobile code risk categories and usage guides that implement and are consistent with DoD cybersecurity policies, standards, architectures, security controls, and validation procedures. This is to be done with the support of the NSA/CSS, using input from stakeholders, and using automation whenever possible." Complying with these protocols is essential for any organization wishing to work with the Defense Contract Management Agency. As cybersecurity threats are increasing in frequency and scope, government agencies are requiring increased cybersecurity awareness and enhanced cybersecurity postures among businesses who wish to work with government agencies. Beginning in 2015, the DoD DFARS (Defense Federal Acquisition Regulation Supplement) subpart 204.73 was amended for all companies with DoD contracts or subcontracts. This clause requires adequate safeguarding of controlled technical information and reporting of cybersecurity incidents; meaning businesses who do not meet these cybersecurity compliance requirements no longer have the ability to bid on government contracts. Furthermore, companies who are found negligent or noncompliant in these required practices may lose existing, long-term contracts or face system shutdown due to noncompliance.

Along with the government private and public organizations have established regulations and guidelines regarding protection of sensitive information using published standards. These standards, published as security information and guideline requirements, are designed to protect a myriad of different businesses, but all of these regulations and guidelines share the common goal of combating cybersecurity risk and vulnerabilities. The sets of guidelines for software security continue to expand. There are many notable, examples of published security information and guideline requirements each referred to herein as a software security guideline set (SSGS).

SSGSs published by the National Institute of Standards and Technology (NIST) include:

a. NIST Special Publication 800-53 "Security and Privacy Controls for Federal Information Systems and Organizations." This SSGS contains the steps in the Risk Management Framework that address security control selection for federal information systems in accordance with the security requirements in Federal Information Processing Standard (FIPS) 200. This includes selecting an initial set of baseline security controls based on a FIPS 199 worst-case impact analysis, tailoring the baseline security controls, and supplementing the security controls based on an organizational assessment of risk. The security rules cover 17 areas including access control, incident response, business continuity, and disaster recoverability.

b. NIST Special Publication 800-171 "Protecting Controlled Unclassified Information in Nonfederal Information Systems and Organizations.": This SSGS covers the protection of Controlled Unclassified Information (CUI) while residing in nonfederal information systems and organizations is of paramount importance to federal agencies and can directly impact the ability of the federal government to successfully carry out its designated missions and business operations. This publication provides federal agencies with recommended requirements for protecting the confidentiality of CUI.

In relation to credit cards there is the PCI DSS "Payment Card Industry Data Security Standard." This SSGS is a proprietary information security standard for organizations that handle branded credit cards from the major card schemes including Visa, MasterCard, American Express, Discover, and JCB. The PCI Standard is mandated by the card brands and administered by the Payment Card Industry Security Standards Council. The standard was created to increase controls around cardholder data to reduce credit card fraud.

The International Organization for Standardization (ISO) and the International Electrotechnical Commission (IEC) specifies and SSGS as ISO/IEC 27001:2013 "Information technology—Security techniques—Information security management systems—Requirements." ISO/IEC 27001: 2013 specifies the requirements for establishing, implementing, maintaining and continually improving an information security management system within the context of the organization. It also includes requirements for the assessment and treatment of information security risks tailored to the needs of the organization. The requirements set out in ISO/IEC 27001:2013 are generic and are intended to be applicable to all organizations, regardless of type, size or nature.

There is also an SSGS from the ITIL "Information Technology Infrastructure Library 2011 Edition." ITIL describes processes, procedures, tasks, and checklists which are not organization-specific, but can be applied by an organization for establishing integration with the organization's strategy, delivering value, and maintaining a minimum level of competency. It allows the organization to establish a baseline from which it can plan, implement, and measure. It is used to demonstrate compliance and to measure improvement.

Another SSGS is the FFIEC Assessment "Federal Financial Institutions Examination Council Cybersecurity Assessment Tool." The content of the Assessment is consistent with the principles of the FFIEC Information Technology Examination Handbook (IT Handbook) and the National Institute of Standards and Technology (NIST) Cybersecurity Framework, as well as industry accepted cybersecurity practices. The Assessment provides institutions with a repeatable and measurable process to inform management of their institution's risks and cybersecurity preparedness.

An SSGS in the field of health care is the HIPPA "Health Insurance Portability and Privacy Act (HIPPA) Security Rule." In the health care space, entities (covered entities and business associates) regulated by HIPAA must comply with the HIPPA Security Rule to ensure the confidentiality, integrity, and availability of electronic protected health information (ePHI) that they create, receive, maintain, or transmit.

At present, determining whether a computer system meets and/or deviates from a particular SSGS involves substantial human evaluation of many lines of guideline codes and various manual steps. Although some attempts have been made to automate these procedures they have generally failed because these attempts have been incomplete, inaccurate, or have failed to keep abreast of the fast-paced nature of continuously evolving cybersecurity threats. The software approaches to automate SSGS compliance status are also problematic since they rely more extensively on uploaded or installed third-party software and specialized graphical user interfaces.

Most involve either installing a client side "agent", which is a small software application that runs on each OS instance and acts as an "agent" or representative for the compliance software. The agent is used with a third party application which usually runs on its own server to determine cybersecurity compliance. Other methods involve using third party software applications that would need to be installed locally or on a separate server and require privileged level access to login to those operating system instances under evaluation.

Moreover, with respect to the known programming attempts to automate SSGS compliance, these attempt use complex search and interrogate software (SAI) on the computer system under review for SSGS compliance (hereinafter "Subject System.") Depending on the particular vendor, such SAI software may easily contain more than 100,000 lines of code to find data and analyze the operational parameters and function of the targeted computer or computer system. This is a very conservative estimate when one considers that the average iPhone app will contain 500,000 lines of code.

This SAI software approach also adds complexity by requiring adaptability in configuration for the Subject System" and overcoming security safeguards of Subject system. The resulting complexity of the SAI software combined with the aforementioned need to keep it updated have deterred attempts to automate the portions of SSGS compliance review that may otherwise lend itself to such automation.

The time intensive methods that are generally now employed to determine a security status do not meet the need of staying abreast of threats to systems and data security. Each status check only gives a snap shot of a Subject System's status at an instant in time. Security threats occur at ever increasing frequency and protocols need to rapidly advance to meet the dynamic nature of such threats. Thus, a system's security status can be out of date almost as soon as it's determined. Therefore, new methodology is needed to give status determinations at a frequency not currently deliverable by present methods.

Reliable methods and systems are sought that can deliver the security status of a Subject System in much faster way than is presently available.

BRIEF SUMMARY OF THE INVENTION

Provided herein are methods and systems that use standard embedded software of a Subject System to give its security status at a given point in time under a particular SSGS. The methods of this invention equips a Subject System to, in essence, check its own security status. By using the already resident software found in most computer systems and inherent access to the native operating system (OS), the method and systems of this invention have been found to greatly reduce the time required to determine a security status of a Subject System. The method of this invention automates much of the status determination for SSGSs in a highly efficient manner by taking advantage of the embedded programming platform available in the computer system under evaluation. The other alternatives are presently done using manual methods or cumbersome SAI software and cannot provide the results in the same manner as the present invention. The method of the invention incorporates much of the information on resident data, functionally and operations that others have attempted to automate in evaluating SSGS compliance status, but unlike the others, does not rely extensively on uploaded or installed third-party software and specialized graphical user interfaces.

This invention will use the command line as an interface to establish a Security Check Script (SCS) In one aspect this invention may operate using only command line scripts and/or coding to access the native OS of the Subject Systems. The command line functionality is provided by the OS of the Subject System. All program commands of the instant method are run locally on each OS under evaluation and do not require additional software applications to be purchased, installed, or configured other than the program of this invention. All network access and communication will be supplied by the native OS command line using the program of this invention.

It has been found that the native OS can be readily utilized to provide the features, configurations, and parameters that define the security condition of a Subject System with little need for additional overlay programming. By using the native OS facilitates the extraction of the necessary information to determine much if not all of the Subject System's security status.

While using automation to check a computer systems compliance with SSGS will require a scan of many if not all facets of the Subject System under review, this invention's use of the native OS provides in effect a native OS "agent" that greatly simplifies the evaluation process and the assembly of results. As a result, the invention improves the functioning of a computer by enabling a computer system to in essence examine itself for compliance with external security protocols. The unique software approach of this invention uses the embedded OS of a computer in combination with one or more input scripts to create an automated, self-evaluative system.

Moreover, for each Subject System, to be evaluated for security compliance, this invention provides the advantage of using the already existing embedded software functionality of the operating system command line to obtain configuration settings for system hardware and software directly. This also includes configuration settings for application software installed on the system. Once that information is obtained, it can be compared to the security requirements given by the particular SSGS for compliance or lack of compliance or obtain information to support manual evaluation of compliance. This approach is more streamlined, more accurate, easier to use and because it directly uses software that is provided by the same vendor that provides the operating system and application software under evaluation, the vendor that will be responsible for maintaining the capability of access to that software and hardware as it is periodically updated. Thus, this vendor has and will inherently also provide more detailed access to their own software than a third party vendor could be able to provide now and into the future.

An analogy could be trying to inspect a car for operational and air pollution requirements. Where the car manufacturer/vendor provides the car under inspection with built-in sensors that can be used for such purposes, evaluations are greatly facilitated. This invention takes advantage of functionality that is inherent in the system undergoing evaluation to facilitate and streamline the evaluation.

Accordingly, it has been found that by using the method and/or a system arranged in accordance with the method of the required lines of codes for adding automation to an SSGS drop by orders of magnitude when compared to other approaches. In specific cases, it has been found that fewer than 5000 lines of code are needed to add as much automation as possible to an SSGS. While other applications of this method to other SSGSs may require more lines of code, in most cases the required lines of additional code will not exceed 10,000.

Aside from simply reducing the size of a script or program, shrinking the required lines of code for automating SSGS evaluations is particularly advantageous. System security issues constantly change; as a result the coding to automate an SSGS requires continual updating. This combined with the fact that any SSGS is only good for a single point in time means that the coding associated with any script or program for automated SSGS evaluation will require frequent maintenance and updating. Fewer lines of code simplify maintaining and updating the SSGS software along with the cost associated therewith.

Accordingly, this invention advantageously transforms the operation of performing SSGS compliance evaluations in multiple ways. It allows SSGSs to be more rapidly performed to meeting the ever increasing need for preserving system security. It operates within the environment of the Subject System by using the embedded software of its OS to maximize efficiency and overcome internal protections in retrieving information from the Subject System that the SSGS requires for its evaluation. In reducing complexity, the required script length to perform automated SSGS reviews by the method of this invention drop dramatically so that programming to perform automated SSGS review becomes easier, cheaper and more practical.

In a broad aspect, this invention is a method for determining the point in time compliance status of a computer system with a software security guideline set (SSGS) wherein the computer system has a command line shell available through its native operating system. The method inputs into the computer system a script input comprising comma separated values (CSVs) that provide data for an evaluation of the computer system's compliance with the SSGS under consideration and codes a series of command lines into a Security Check Script (SCS) retained at least temporarily in the computer system memory using the native operating system of the computer system. The SCS performs at least a portion of the automated evaluation of the SSGS under consideration when executed and generates a series of condition codes. The method also assembles at least a portion of the condition codes into an output file formatted for at least partial determination of a compliance status of the computer system with the SSGS under consideration. The output file may provide data suitable to generate at least one of XCCDF data, Continued Monitoring Risk Score (CMRS) data, or an xml file. With respect to output, the SCS may generate data for development of a text file that provides user readable information related to the security status of the Subject System.

In other variations of this aspect, the SCS extracts data from the Subject System via wireless data transfer and the SCS may be programmed for removal from the Subject System following execution of the SCS.

In a further aspect, the computer system comprises a central processing unit and one or more remote components that communicate with the central processing unit through a wireless interface and least one of the remote component or the central processing unit retains the SCS. In addition, the central processing unit communicates with one or more remote capabilities.

In another aspect, the computer system may transform the CSVs for data transfer that is compatible with the command line format. It is also possible to process the CSVs after the coding of the series of command lines into the SCS.

In a further aspect, the computer system comprises a network of computers and the output file provides an at least partial determination of the compliance status of all the computers in the network of computers. The computer system may further comprise an arrangement of multiple components including at least several components from the group consisting of laptops, desktops, other portable devices and servers, associated with domain sites. The computer system may also comprise multiple servers that may communicates with multiple domains.

In a specific aspect, the method may comprises a software security technical implementation guideline (STIG) under the control of the Department of Defense (DoD). In this and other aspects the conditions codes include an indication of an open status, a closed status or an undetermined status.

In another method aspect, the invention is a method for determining the point in time compliance status of a computer system with a software security guideline set (SSGS) wherein the computer system has a command line shell available through its native operating system and remote capabilities. The method inputs into the computer system a script input comprising CSVs that provide data for an evaluation of the computer system's compliance with the SSGS under consideration and codes a series of command lines into a SCS retained at least temporarily in the computer system memory using the native operating system of the computer system wherein the SCS performs at least a portion of the automated evaluation of the SSGS under consideration. The method extracts at least a portion of the information for the determining the compliance of the Subject System with the SSGS from remote capabilities and executes the SCS to generate a series of condition codes and user readable information related to the security status of the Subject System. Programming of the SCS may also assemble at least a portion of the condition codes into an output file formatted for at least partial determination of a compliance status of the computer system with the SSGS under consideration. In a more specific application of this aspect the method the SSGS comprises a STIG under the control of the DoD. In other variations, the computer system may comprise an arrangement of multiple components including at least several components from the group consisting of laptops, desktops, other portable devices and servers, associated with domain sites.

In a system aspect, this invention is a computer system adapted to provide an indication of its compliance with a software security guideline set (SSGS). The system comprises an operating system having a Command Shell and a series of command lines coded using the native operating system of a computer into a security check script (SCS) that is coded to perform automated evaluation of an SSGS under consideration and is retained at least temporarily in the computer system. The system includes an input interface capable of receiving a file of comma separated values (CSVs) that comprise at least a portion of the SSGS and provide at least a portion of the data to evaluate the compliance of the computer system with the SSGS under consideration. The system has a processor suitable for generating and executing SCS using the CSVs to generate a series of condition codes and an output interface capable of exporting a set of condition codes suitable for at least partial determination of the compliance status of the computer system with the SSGS under consideration. The SCS may be coded in the system to transforms the CSVs for data transfer that is compatible with the command line format and/or programmed to generate an output file of at least one of XCCDF data, CMRS data, or an xml file. In other variations of this system aspect, the computer system may comprise a network of computers and SCS is coded to generate an output file that provides an at least partial determination of the compliance status of all the computers in the network.

In this system aspect, the computer system may again be configured to evaluate its compliance with an SSGS is comprised of software security technical implementation guideline (STIG) generated by the Defense Systems Agency (DISA.)

DESCRIPTION OF THE FIGURES

The present application can be best understood by reference to the following description taken in conjunction with the accompanying figures, in which like parts may be referred to by like numerals.

DETAILED DESCRIPTION

Figure 1:
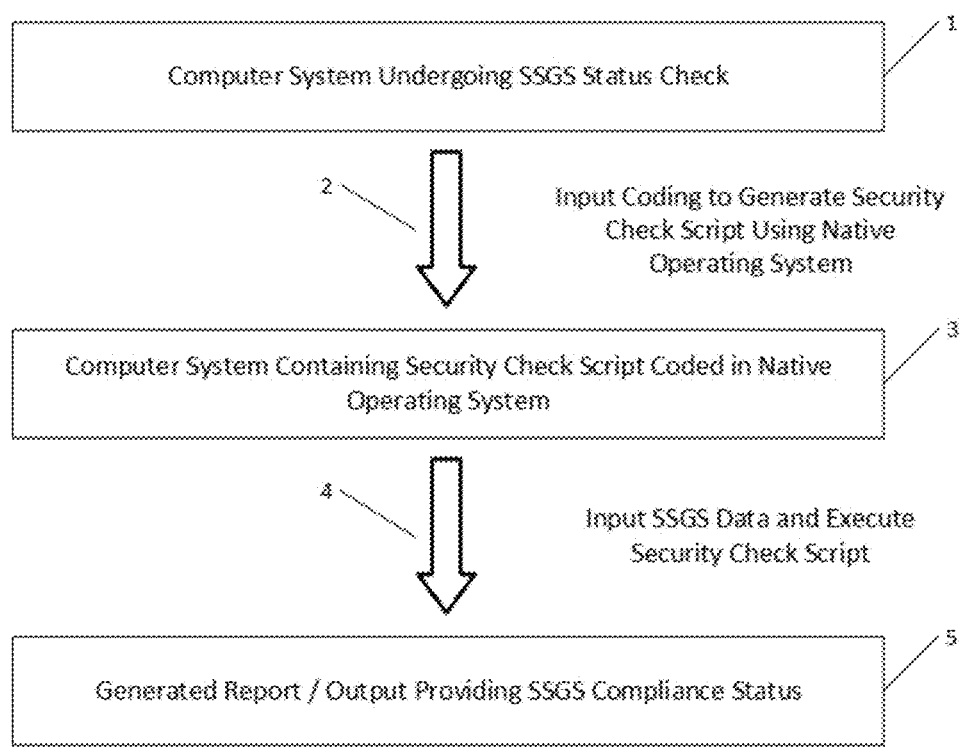
FIG. 1 is a flow diagram showing an overview of the method and the computer system functions of this invention.

The following description sets forth exemplary methods, parameters and the like. It should be recognized, however, that such description is not intended as a limitation on the scope of the present disclosure but is instead provided as a description of exemplary embodiments.

Definitions

Operating system (OS): OS is system software that manages computer hardware and software resources and provides common services for computer programs. The OS is a component of the system software in a computer system. Application programs usually require an operating system to function.

Command shell: Command shell is a separate software program that provides direct communication between the user and the OS. The non-graphical command line user interface provides the environment in which you run character-based applications and utilities. The Command Shell executes programs and displays their output on the screen by using individual characters.

Extensible Configuration Checklist Description Format (XCCDF): XCCDF is a specification language for writing lists, benchmarks, and related kinds of documents. An XCCDF document represents a structured collection of security configuration rules for some set of target systems. The specification is designed to support information interchange, document generation, organizational and situational tailoring, automated compliance testing, and compliance scoring. The specification also defines a data model and format for storing results of benchmark compliance testing. The intent of XCCDF is to provide a uniform foundation for expression of lists, benchmarks, and other configuration guidance, and thereby foster more widespread application of good security practices.

Software Security Guideline Set (SSGS): One or more documents that states in writing how a company plans to protect the company's physical and information technology (IT) assets. A company's security guide may include an acceptable use policy, technical implementation of approved security controls, employee education programs about securing company assets, or a procedure for evaluating the effectiveness of the security guide to ensure that any identified risks will be mitigated.

Extensible Markup Language (XML): A system for annotating a document that defines a set of rules for encoding documents in a format that is both human-readable and machine-readable.

Comma Separated Values (CSV) File: A file that stores tabular data (numbers and text) in plain text. Each line of the file is a data record. Each record consists of one or more fields, separated by commas. The use of the comma as a field separator is the source of the name for this file format.

STIG Viewer: An application published by the US Defense Information Systems Agency (DISA) at the direction of the DoD. An input file, in XML format, that can be uploaded into this tool and used to create checklists into which assessment results can be entered and managed. Additional features allow for searching of individual STIGs (or multiple STIGs) for particular subject areas or keywords. An additional benefit provided by the STIG viewer application is the ability to generate STIG CSV files. The CSV files are then manually modified in preparation for STIG automation. These CSV files are then used as input to the SecureStrux STIG automation process.

Security Technical Implementation Guide (STIG): A cybersecurity methodology for standardizing security protocols within networks, servers, computers, and logical designs that enhance overall security. These guides are published by DISA at the direction of the DoD and, when implemented, enhance security for software, hardware, physical and logical architectures to further reduce vulnerabilities.

A Security Check Script (SCS) is a script that in the practice of this invention can be made at least temporarily resident in the memory of at least one computer in a Subject System to interplay with resident software in the Subject System for the retrieval of information that is needed to analyze the compliance of a Subject System with an SSGS. The SCS is established using, at least in part, the Command Shell of the Subject System.

Subject System: A computer system that is undergoing an evaluation under an SSGS that will comprise one or more computers that have connectivity with at least one computer upon which a Security Check Script (SCS) may be loaded for executing the method of this invention and that can receive data from an SSGS as input for execution by the SCS. The limits of a Subject System may be further defined as a Multiple Component Arrangement (MCA) controlled by a single OS instance.

Host-Based Security System (HBSS): The official name given to the Department of Defense (DoD) commercial-off-the-shelf (COTS) suite of software applications used within the DoD to monitor, detect, and defend the DoD computer networks and systems. HBSS is based on McAfee, Inc.'s ePolicy Orchestrator (ePO) and other McAfee point product security applications such as Host Intrusion Prevention System (HIPS).

Assured Compliance Assessment Solution (ACAS): The official name given to the Defense Information System Agency (DISA) commercial-off-the-shelf (COTS) suite of software used within the DoD to monitor and detect known system vulnerabilities. The software provides a mechanism to enable the assessment of U.S. Department of Defense (DoD) enterprise networks and connected IT systems against DoD standards, as well as to identify any known system vulnerabilities. ACAS is based on the Nessus Security Scanner from Tenable Network Security.

Continuous Monitoring Risk Scoring (CMRS): CMRS is a web based system that visualizes the cybersecurity risk of the Department of Defense (DoD) based on published asset inventory and compliance data. CMRS leverages the use of automated data feeds. Currently, there is a risk dashboard generated based on published Host Based Security System (HBSS) data as well as reports based on published Assured Compliance Assessment Solution (ACAS) data.

Multi-Component Arrangements (MCA.): MCA encompasses any equipment that may comprise a Subject System and fall under the requirements for compliance review under an SSGS. This term may be as expansive as the SSGS requires with respect to a Subject System and includes all hardware and software associated with the functionality and capability of a Subject System Specific non-limiting examples of hardware include multiple user portals and other supporting and ancillary equipment that provide additional capability and resources to a Subject System and such equipment may have connectivity with in full or in part with other equipment in the Subject System through hard wired mediums or wireless interfaces. The term equipment as used in this definition includes components, devices and other hardware without regard to the specific terminology as long as such an item of equipment has connectivity with another item of equipment and is not excluded from consideration in security compliance by an SSGS for which the system is under evaluation. Non-limiting examples of such equipment include workstations that may comprise laptops, desktops, portable devices, phones and other such equipment; and servers of the type described as Web Database, file, DNS domain Controllers, and application. The listing of specific equipment is not intended exclude the use this invention with any equipment that may be associated with domains in general. An MCA also includes the software needed for its full range of functionality whether stored or accessed locally or remotely with regard to any mode of communication used in conjunction with such storage or access.

Remote Capabilities: Remote Capabilities are one or more functions that a Subject System has available to it through wireless remote access, examples of which include software, computer processing, data processing, data storage, cloud computing, Dameware, TTP, FTP etc.

Central Processing Unit: A central processing unit is a device capable of processing information electronically.

Overview and General Description

In one aspect, this invention is suitable for providing a security status under the standards established by a wide variety of SSGSs. These standards include cybersecurity requirements for banking, health care, and other information technology management requirements. The method and systems incorporating this invention can successfully evaluate and return results for multiple cybersecurity standards (hereinafter referred as SSGSs), across different types of industries. This method and the systems of this invention have specific utility to evaluation of the STIG viewer requirement as previously described.

SSGSs may come in different forms. Some of the guidelines are in the form of checklists, while others may be instructions or directions for meeting compliance standards. Often the SSGSs appear or are condensed into a series of comma separated values. To get the SSGSs into a suitable form for the automated processing of this invention manual conversion may be necessary. Such conversion of the SSGS data is readily accomplished by those familiar with programming.

In another aspect, this invention comprises an automation tool that uses command line functionality inherent within the OS to identify vulnerabilities and insecure configurations which are unique to an SSGS and in particular to the STIG process.

In another aspect, this invention comprises a method for automating SSGS compliance suitable for being maintained with the incorporation of the new changes to the SSGSs in the SCS scripts that it generates.

The overview of the method and system as shown in FIG. 1 captures the basic steps of the invention. The method starts with an identified computer system (See box 1) that is targeted for an evaluation of its compliance (herein referred to as a Subject System) with a set of guidelines, an SSGS, that determine whether the system meets the security requirements of a particular entity. A target computer of the Subject System is then programmed via step 2 to establish an SCS that can process the data supplied by the SSGS to determine the security status of the targeted computer with respect to its particular configuration and the programs and information resident on the Subject System. The SCS is established via the use of the command line to produce a series of code lines together with any additional coding or data. This will be the case whether the Subject System is a single computer, or an array of components accessed directly or remotely via wired or wireless connection that may include multiple domains.

This programming to provide the SCS is performed using embedded software that is resident in the computer's memory. Such software can take any form that is capable of generating the necessary SCS to process the SSGS data and determine the security status of the computer system. Most computer systems that are now available routinely have such embedded programming software available as part of its operating system. For Microsoft® operating systems, a well-known example of such embedded software includes Windows PowerShell®. Another commonly used software is the Windows Management Instrumentation (WMI) that is Microsoft's® implementation of Web-Based Enterprise Management (WBEM). Other embedded software may include Microsoft's® Windows Management Instrumentation Command-line (WMIC) that provides a command line interface to WMI. Generation of the SCS may utilize one or more discrete software components that are available as part of the embedded software of the computer system. The programming provides a computer system with having a resident SCS as shown in box 3.

The preceding description of Microsoft® operating systems is only one example of suitable operating systems upon with the method of this invention may find application. This invention can have application to a wide variety of operating systems that control a Subject System that need evaluation under an SSGS. The invention is not limited to particular operating systems and, in the way of example, but not limitation, this invention may be applied to Mac OS® that was developed by Apple®; various Linux™ systems, such as RedHat SUSE™, Mandriva™ and Yellow Dog™; Linux™; and Unix® operating systems such as Solaris™, HP-UX™, OS X™, Inspur K-UX™ and AIX.

Once the SCS is programmed into the Subject System by interfacing with its OS, the SCS operates on an input file of SSGS data and requirements that is received and processed by the SCS in step 4. The SSGS input may be received in any format that is readable or transformable, as previously described into a readable format for processing by the SCS. The SSGS is often in the format of comma separated values (CSVs) that can be readily transformed to computer readable input.

Although FIG. 1 shows the input coding and the input of the SSGS as two separate steps it may be performed as a combined step. In this aspect of the method the CSVs are typically input along with the necessary scripts and data to configure the subject system to execute the SCS. The SCSs resides as a static software segment that operates on the CSVs that are input to initiate the dynamic phase of the Subject System operation. It is this dynamic phase that performs the necessary operation on the Subject System's software, conditions, operational configuration, and other features to determine its compliance status.

In the practice of the aforementioned aspect of the invention, the loading of the CSVs and SSGS requirements initiates a compliance review session. The static portion of the software that contains the scripts associated with the SCS may remain resident in the memory of the Subject System. In a preferred aspect of the invention the scripts associated with the SSGS compliance check will close down and be removed from the Subject System once the security status or compliance of the Subject System has been established.

Processing of the SSGS data by the SCS generates data that gives the determination of the compliance status for the Subject System (See box 5.) This output may take any desired form that provides the security status or compliance of the Subject System with the SSGS. The desired form of the output may be dictated by reporting protocols demanded by the authority that promulgates the SSGS.

Figure 2:
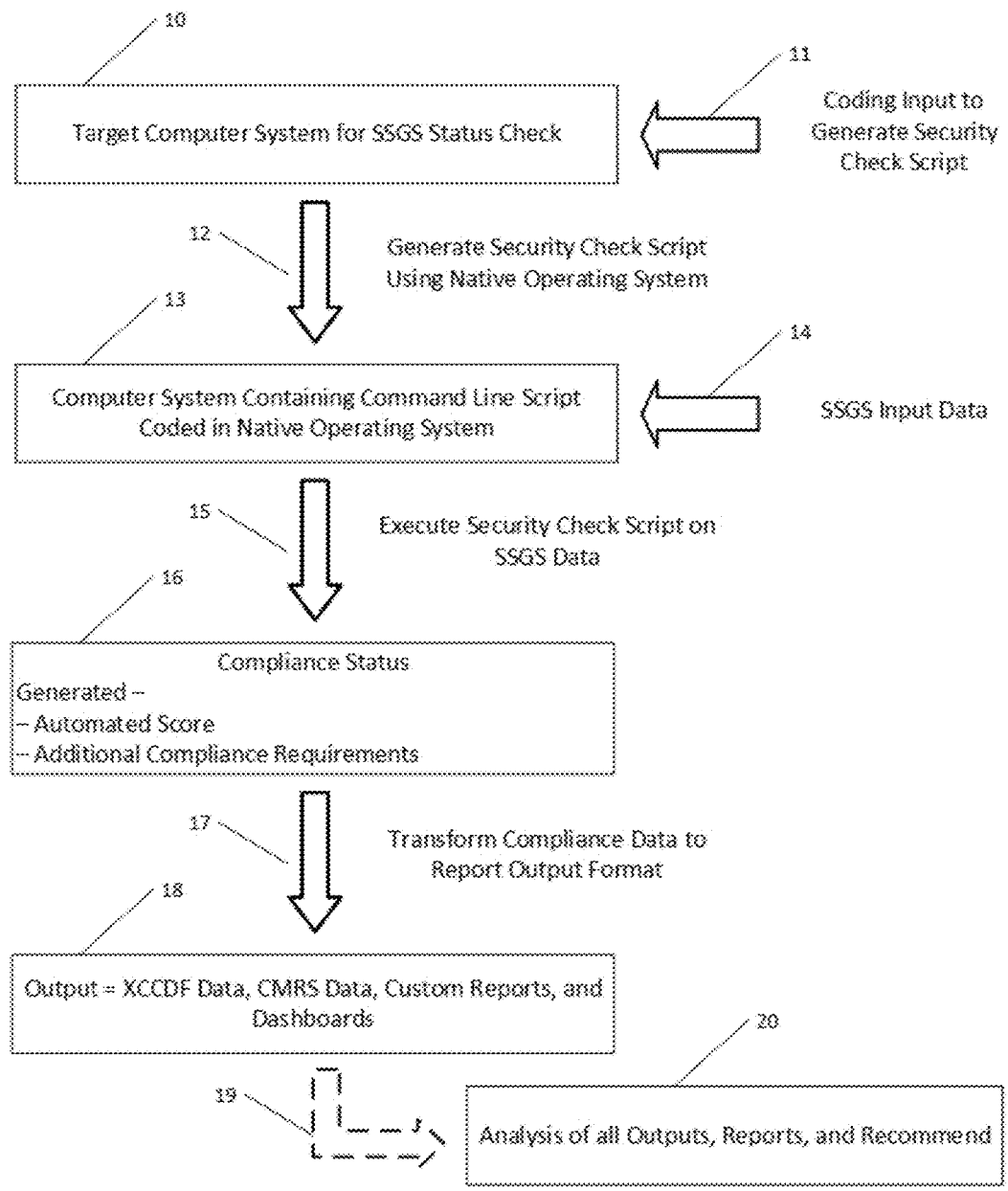
FIG. 2 is a flow diagram showing a series of generalized steps by which the method of this invention may be performed and that may be incorporated into a computer system of this invention.

FIG. 2 gives a more complete and detailed logic diagram for a representative manner of utilizing the method of this invention and for configuring a Subject System to carry out the method of this invention. The step identified by the number 10 shows the identification of the System for the SSGS status check. Coding input 11 for compliance with a particular SSGS is provided to the Subject system computer for generating the SCS. The SCS is then generated as shown by the arrow of step 12 using the native operating system to configure the Subject System into a computer system having the SCS embedded for execution (See box 13.) The compliance data 14 that makes up the SSGS is then input into the Subject System containing the embedded SCS for execution in the step 15. Processing of the SSGS data with the script generates a compliance status as shown in box 16. The compliance status may include the automated generation of a compliance score. The SCS may also generate tags associated with text material that describes additional security requirements and/or deficiencies.

The method and system may include a further automated step (see arrow 17) that transforms the output of the compliance check into other desired formats or reports. Examples include XCCDF data, CMRS data, custom reports and dashboards (See box 18.)

The automated data generated by and containing the evaluation of the Subject System typically undergoes a manual review step indicated by arrow 19. This step as indicated by box 20, can include an additional manual service by those using the method of this invention whereby analysis is performed and recommendations are generated.

The specific type of programming required to generate the SCS and provide a system configured with an embedded SCS will vary with the nature of the SSGS. Such programming will typically require extensive coding of independent and nested decision statements that may lead to further selective script portions of the SCS. Ultimately this coding will develop a set of codes that indicate the security status or condition of the system and may include the aforementioned tags that allow the generation of appropriate textual output.

The actual coding required to do the security will again vary with the particular SSGS for which the SCS is adapted. Those familiar with programming will understand from the description provided herein how to perform the detailed coding needed to utilize the embedded software and scripts of a Subject System to perform the functions in the manner described herein.

Figure 3:
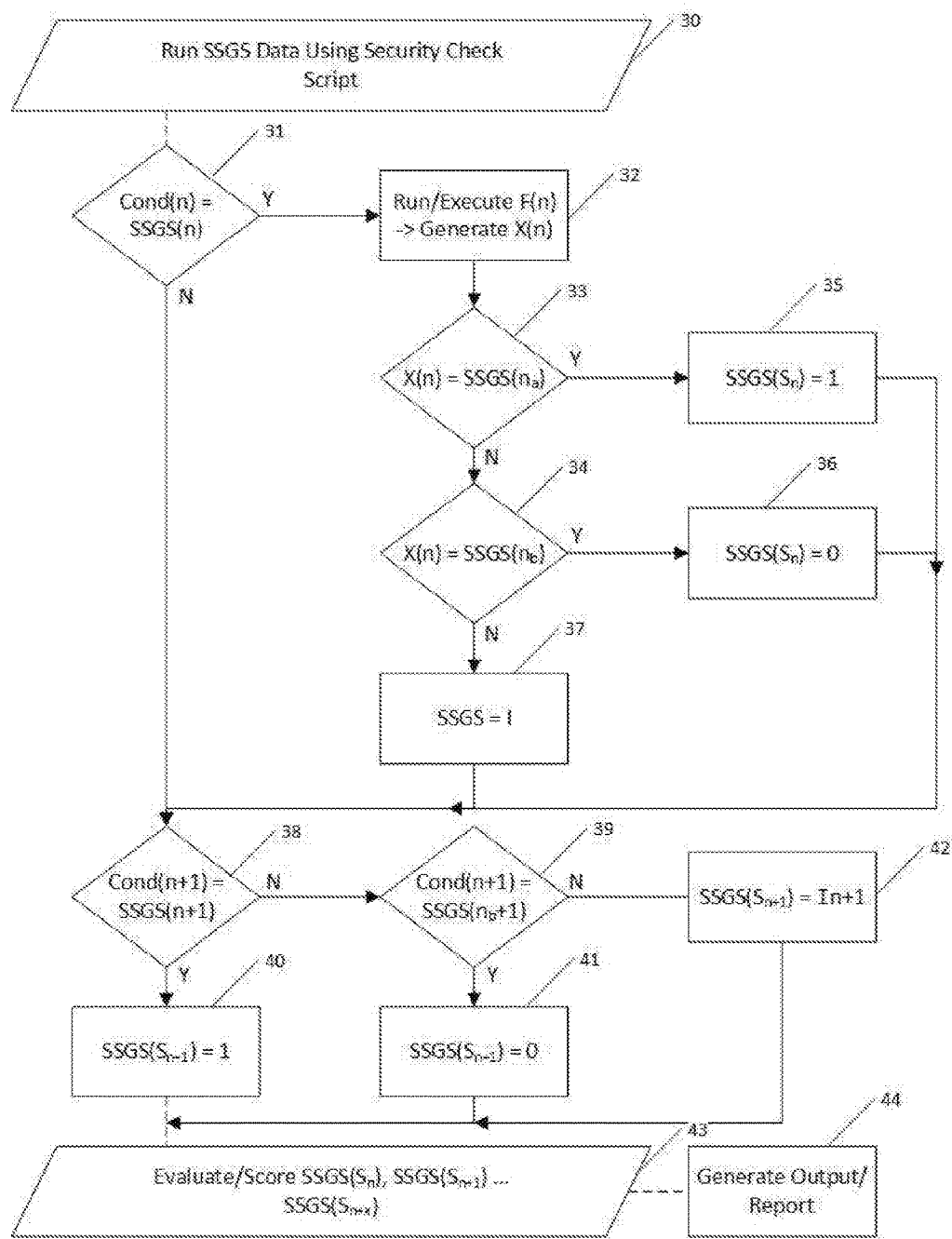
FIG. 3 is a flow diagram showing detailed logic conditions and actions that are coded into the native operating system of computer system by the method of this invention.

Representative flow chart logic containing the summary steps for one form of such coding is shown in FIG. 3. The logic flow begins with step 30 in which the SCS is run using the SSGS input data. As execution of the SCS proceeds information is extracted from the Subject System to find the presence of various conditions or information within a Subject System at the time of the status check. Decision box 31 shows a particular condition as COND (n) that is compared to a required value given by the SSGS and shown as SSGS (n). Depending on the outcome of the comparison, the value of COND (n) may lead to further processing of additional input items in a function given as F(n) in operational step 32 that generates a calculated value X(n). X(n) may in turn get evaluated in additional decision steps 33 and 34. These steps may use additional values from the SSGS input, given as $SSGS(n_a)$ and $SSGS(n_b)$, that lead to assigning a security value for the particular compliance standard under evaluation for SSGS(n) and as shown in operational steps 35, 36, and 37 where for this case a value of 1, 0, or I is assigned.

In this example, once the condition that corresponds to the value for SSGS(n) has been evaluated, execution of the program continues to assess COND (n+1) with respect to the value of SSGS (n+1). This evaluation involves a straight comparison of values without additional processing to determine derived values or conditions as carries out with respect to SSGS(n) as described above. Thus COND (n+1) undergoes one decision step 38 with respect to SSGS(n+1) and depending on the outcome another decision step 39 with respect to SSGS(n6+1). Depending on the outcome of the comparisons SSGS(Sn+1) may again be assigned a value of 1, 0, or I in one of operational steps 40, 41, or 42.

Execution of the SCS continues with check of additional conditions and the assignment of values or tags to record the SSGS compliance status. Once values have been assigned to the SSGS items under consideration the values may be further processed in step 43 to give an overall score(s) or other output data and information. The score(s) and/or other information may be further processed in step 44 to generate specific output in a desired format such as the formats previously described.

The assigned values of 1, 0, or I as described in conjunction with the foregoing flow chart are typical of the conditions codes generated for compliance with many SSGSs. The usual outcome of checking a particular standard under an SSGS results in the finding of a vulnerability, no vulnerability or an inability to determine the existence or absence of a vulnerability. These three conditions are also referred to as open, closed, or indeterminate. In most cases, indeterminate means not determinable on the basis of the information obtainable directly from the computer system under evaluation.

The operations, represented by F(n) in FIG. 3, that may be performed on the information found by a scan of the Subject System, will typically vary in complexity. In certain aspects of the invention the function F(n) may comprise a simple operation that analyzes or performs simple operations such as converting values into a different format. In other aspects of the invention F(n) can comprise a subroutine that may analyze multiple variables simultaneously or perform checks on various software programs that are resident on a Subject System.

A representative example of processing a specific requirement in accordance with FIG. 3 would be the requirement for use of passwords in carrying out certain operation on a Subject System. This example is provided in the way of explanation and not limitation of the application of the invention to any type of specific requirement. The check for a password requirement will often consist of a straight comparison of values. In carrying out such a check in accordance with FIG. 3 the native operating system of the Subject System would be accessed to provide a condition code for the status of password usage and would be assigned a value under the label COND (n+1).

The value under label COND (n+1) would be checked in decision step 38. The SSGS data would provide a value for comparison with the value under label COND(n+1) which, in following the flow chart FIG. 3 would be assigned to the label SSGS(n+1). The value of SSGS(n+1) would represent the required value for meeting the particular password usage requirement. If the value tied to COND (n+1) matches the value assigned to the label SSGS (n+1), then the label SSGS(Sn+1) is assigned a value of 1 in processing step 40 so that the status evaluation in this example can add to the positive score for the compliance review at hand. The automated portion of the proceeds from processing step 40 to the next security requirement under evaluation.

If the value tied to COND (n+1) fails to match the value tied to SSGS (n+1), then the SCS moves to decision step 39. Decision step 39 accesses a new value under the label SSGS($n_B$+1) for a further comparison of the COND (n+1) to find out if there is more to be known about password usage.

If the value tied to COND (n+1) matches the value tied to SSGS ($n_B$+1), then the label SSGS(Sn+1) is assigned a value of 0 in processing step 41. This indicates that the password usage for that portion of the Subject System is not adequate and the compliance score is adjusted according to a zero value for SSGS ($n_B$+1). The script then proceeds from processing step 41 to the next security requirement under evaluation.

If the value tied to COND (n+1) matches the value tied to SSGS ($n_B$+1), then the label SSGS(Sn+1) is assigned a tag In+1 in processing step 42 that will trigger the generation of a message/recommendation for further manual investigation of password usage in the compliance check report or other compliance output that may be generated. The automated portion of the compliance check proceeds from processing step 42 to the next security requirement under evaluation.

The preceding description of FIG. 3 represents the case where the particular condition or operation of the Subject System has a value that the embedded software in the OS of the Subject System can provide directly under label COND (n+1). When checking for other conditions, functions, or information when determining compliance with an SSGS, the extracting of a desired condition indicator value for a particular condition may require additional processing.

This additional processing is shown in steps 32 through 37 of FIG. 3. For example, the compliance review related to passwords may require more investigation than the existence of a password, but may inquire as to the level of protection offered by the password requirements of a Subject System. Again, in the way of explanation and not limitation of the invention, the software available from the OS of the system would extract COND(n) to check for the existence of password coding in the Subject System. COND(n) is compared using the value tied to SSGS(n) provided by the SSGS data.

The information provided by COND(n) is compared to the information tied to SSGS(n). If the comparison of COND(n) against SSGS(n) in decision step 31 fails to indicate that the Subject System evaluates the level of security provided by user selected passwords, the execution of the SCS would advance from decision step 31 to the next decision step under 38. Decision step 38 could check a condition that applies to another password requirement evaluation or, alternatively, to an entirely different compliance requirement.

If decision step 31 indicates that the Subject System has a password evaluation function it can enter a further operational step 32 wherein a subunit of the SCS evaluates the Subject System's scripts associated with passwords in a function F(n). Operational step 32 evaluates the Subject System's scripts using Function F(n) and generates a condition value labeled as X(n) for further evaluation under the requirements of appropriate values of the SSGS data.

Thus, evaluation of the X(n) values proceeds to decision step 33 wherein a value tied to label SSGS($N_a$) is compared to X(n). In this case if the comparison satisfies the decision criteria, the corresponding portion of the SCS assigns a value of 1 to SSGS(Sn). If the comparison in decision step 34 satisfies the criteria, the SCS associates with SSGS(Sn)

with a tag "I" that again will trigger the generation of a message/recommendation for further manual investigation of password requirements of the Subject System in the compliance check report or other compliance output that may be generated and the SCS then proceeds again the next security requirement for evaluation.

Subject Systems with Multiple Components

For simplicity, the basic operation of the method was described above in the context of a limited system. The method of this invention is most usefully applied to Subject Systems that have multiple user portals and other supporting and ancillary equipment that provide additional capability and resources. Accordingly, the method and systems of this invention are applicable to a Subject System that comprises multiple subsystem arrangements. Thus, the method and systems of this invention can scan multiple discrete subsystems simultaneously using each the overall resources of the Subject System and/or the local resources of subsystems. It has been found that the method of this invention is suitable for analyzing multiple subsystems at one time. The number of subsystems can include at least 2, at least 5, at least 10, at least 20, at least 32, or more.

The definitions provided herein define such Subject Systems as MCAs and further describe the scope of such Subject Systems. Therefore, MCAs will also include grouping of equipment into subsystems of a Subject System. FIGS. 4-7 pictorially represents a work flow for applying the method of this invention in a Subject System that comprises an MCA having a variety of subsystems. Furthermore, the method and the systems that may embody the operations of the instant invention are further described in the context of MCAs.

Figure 4:
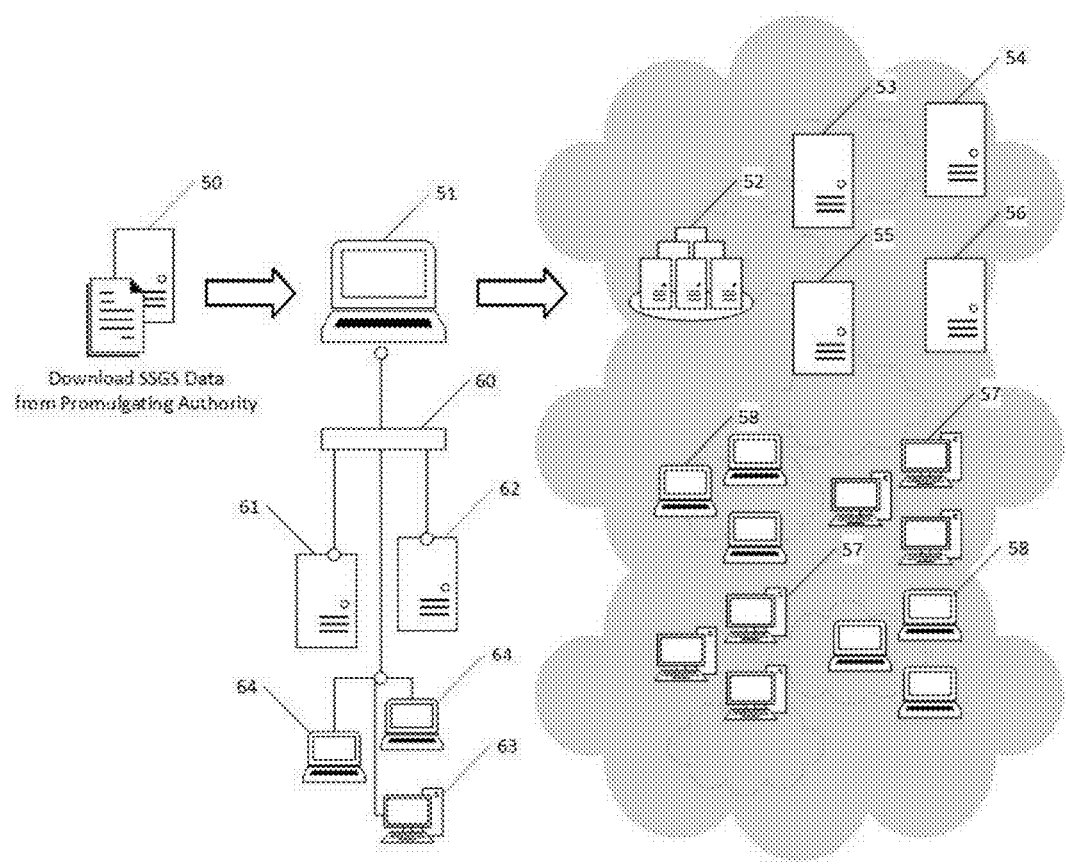
FIGS. 4-7 pictorially represents a work flow for applying the method of this invention in a Subject System that comprises multiple computers servers.

When applying the method of this invention or using a Subject System of the MCA type the workflow for the security check again begins with the requirements of a particular SSGS. FIG. 4 shows the downloading of an SSGS as initial step 50 in the workflow. A computing component of the Subject System having connectivity, directly or serially, with all of the equipment throughout the MCA. For convenience, this computing component is shown in FIG. 4 and referred to hereafter as master computer 51. However, the computing component that receives the SSGS information may comprise multiple discrete items of equipment and the invention is not limited to use of one item of equipment for receiving SSGS information.

FIG. 4 further depicts master computer 51 interconnected to a host of other equipment via hard wired and cloud connectivity. Cloud connectivity links the master computer to various subsystems including a domain 52, a web server 53, a server 54 for DNS (Domain Name System), a database server 55, a file server 56, multiple banks 57 of desk top PCs, and multiple groups 58 of lap top PCs. By use of a hard wired network server 62, a hard wiring network 60 also links master computer 51 with a file server 61, a desk top computer 63 and, docked in a docking station lap top computers 64 that together comprise a subsystem.

Once the SCS is established on master computer 51, the workflow starts by evaluating the hosts on an individual machine, network or networks. For the Subject System depicted by FIG. 4 this requires that the SCS retrieve the operating system information and Subject System's role or roles in the management and control of equipment items 51 through 64. The SCS goes through varies comparisons and operating steps of the general type explained in conjunction with FIG. 3. These steps and operations evaluate the Subject System's operating system, manner communication protocols, data storage, accessibility, and other requirement of the particular SSGS providing the guidelines for review to determine the Subject System's compliance therewith.

Figure 5:
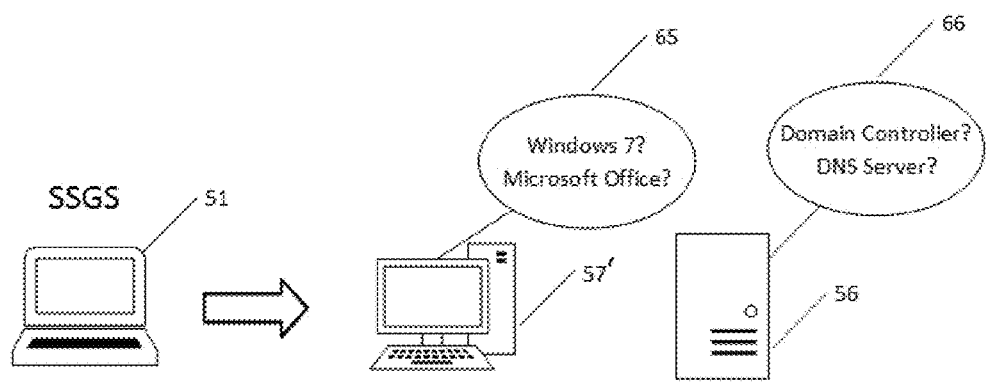

FIG. 5 shows typical inquiries that the SCS may have the master computer seek to evaluate for all or selected items of equipment in an MCA. Additional information on representative type of SSGS inquiries are shown in balloons 65 and 66. For simplicity FIG. 5 only shows a few interrogation statements typical of the investigations carried out for a desktop computer 57' from the cloud connected desktop computer group 57 and for the cloud connected file server 56. As a further inquiry example, cloud connectivity may be driven by the particular form of the embedded software of the Subject System as in case of remote windows PowerShell® where its setup can be HTTP using port 5985 or HTTPS using port 5986.

Figure 6:
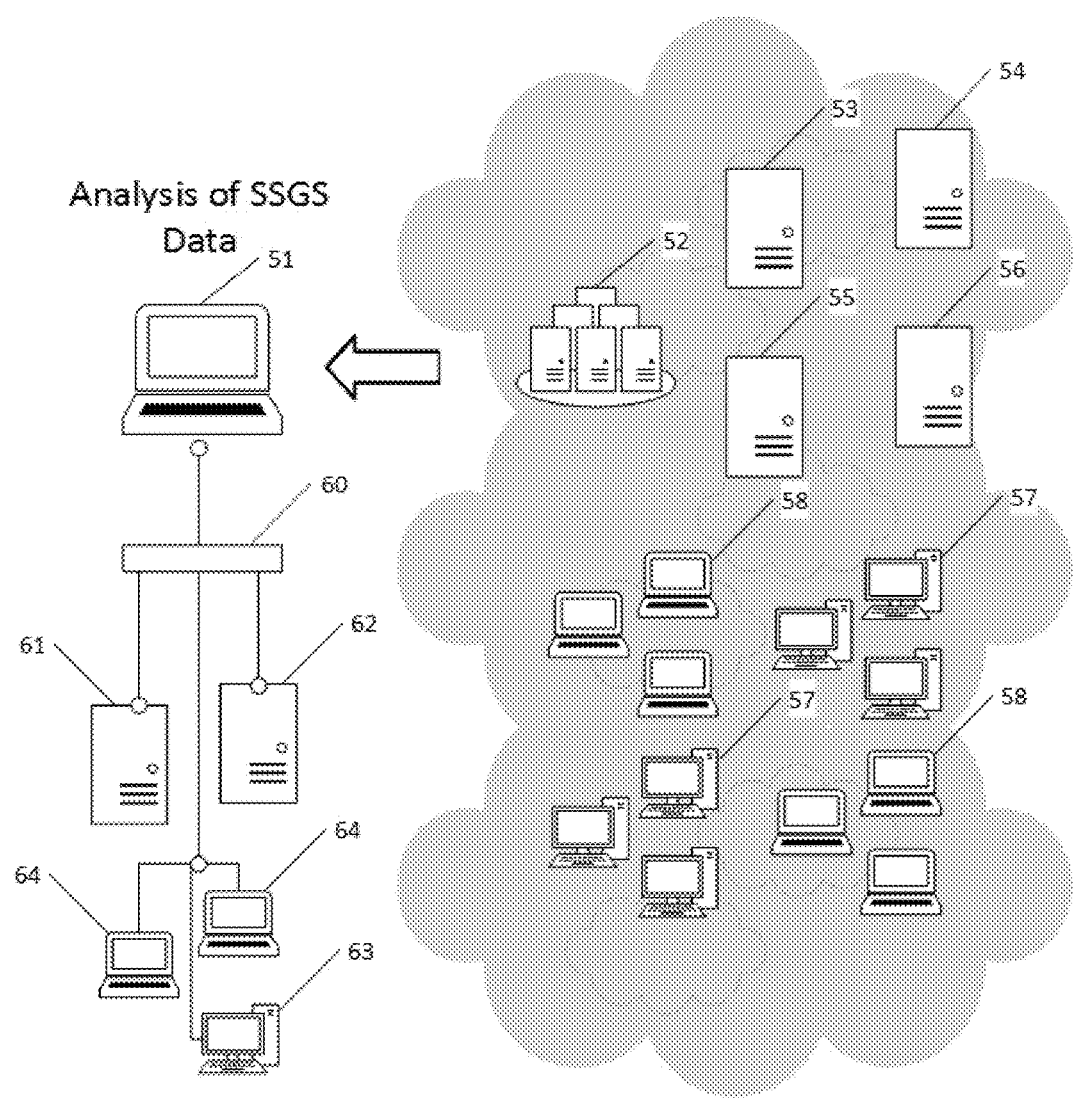

The nature of the SGS inquiries may further require the building of a capabilities list for the Subject System. This may entail retrieval of information detailing each piece of software that exists on the Subject System. For each Subject System that matches the capabilities list, the program collects all programs currently installed on each of each different items of equipment that comprise the MCA. The data from the inquiries of the various item of equipment is returned to master computer 51 as shown in FIG. 6. The information from these inquiries may be used to build a vulnerability scan list generated by execution of the SCS. Comparison of this information retrieved from Subject System inquiries by SCS to that of the SSGS will build the result information. For example, in the case of software, each program in the vulnerability scan list that matches that listed in the requirement settings of the will constitute a portion of the result information.

Figure 7:
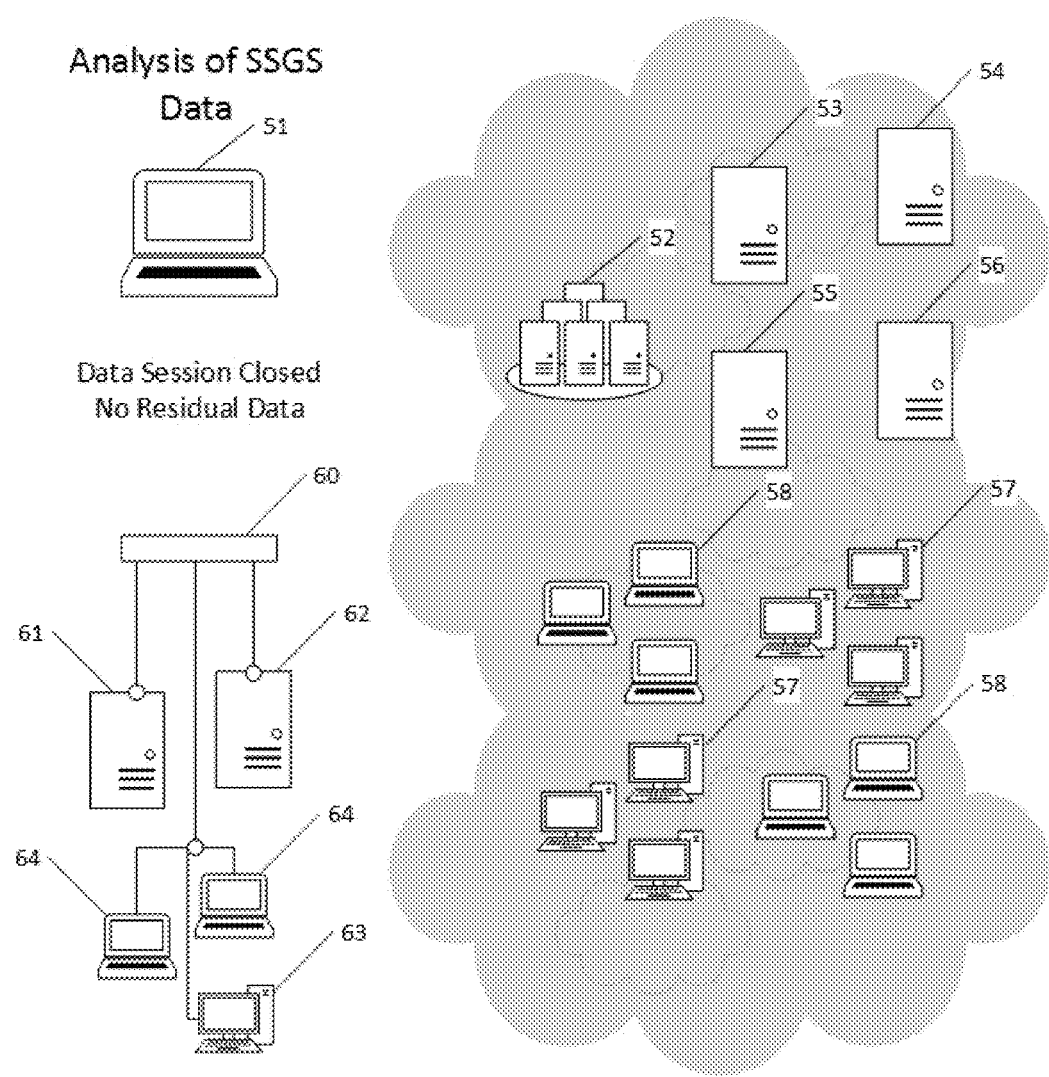

Typically, the result information is compiled into several output formats including for example, but not limited to, XCCDF, CMRS input data, and customer-requested reports and dashboards as previously depicted in FIG. 2 and described therewith. The report information may include information such as SSGS compliance (pass/fail), a calculated score, and remediation recommendations to mitigate the vulnerability, if applicable. As a final step in the method depicted by FIGS. 4-7, the result information is analyzed by those interested in it. The data session associated with generating the result information is then closed as shown in FIG. 7. Preferably the data session ends with the SCS executing steps to remove the SCS from the Subject System so that there is no residual data of scripts left on the Subject System apart from desired records from the evaluation performed to check compliance with the SSGS at hand.

In accordance with the method of this invention the SCS continues to scan multiple systems and can do so simultaneously until it has analyzed the entire network and/or multiple domains. Moreover, the method is suitable for initiating scans simultaneously onto multiple domains and will scan each domain independently since the program of this invention uses local resources.

Figure 8:
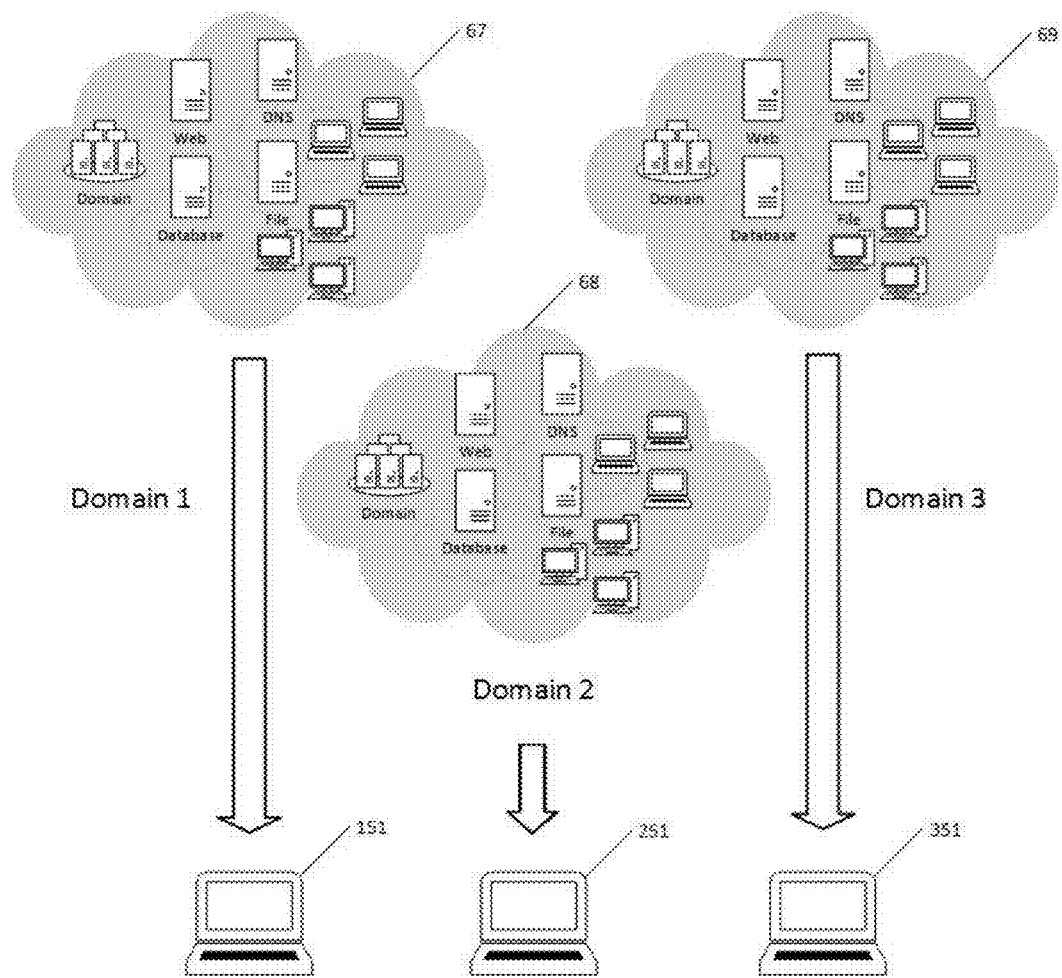
FIG. 8 is a pictorial representation of the application of this method of this invention to perform simultaneous SSGS compliance review of several Subject Systems.

FIG. 8 shows the case where the method of this invention is used to evaluate multiple domains labeled Domain 1, Domain 2 and Domain 3. In case of the system arrangement of FIG. 8, domains 67, 68, and 69 communicate with computers 151, 251, and 351, respectively. Computers 151, 251, and 351 may each be a master computer and contain and independent SCS that is generated to review a particular SGS. Each master computer can evaluate its respective domain independently. In which case the SSGS under evaluate may be different or the same for each master computer. Alternatively, one computer, say computer 151, may serve as a master computer and the computers 251 and 351 may be linked to directly or remotely to computer 151 to support the generation of the SCS and its execution for evaluation compliance with a single SSGS.

In the evaluation of large scale networks or domains the SCS will typically map the entire network or domain. Once the entire network or domain has been mapped, the SCS will initiate program installation inventory scans for each mapped system using a predefined job queue or manual initiation of such scans. The mapped system will collect the data using local resources and once complete, will report the results back to an appropriate electronic repository. In a preferred aspect the SCS will initiate inventory scans of multiple systems simultaneous in a single sequence will begin a new inventory scans as the initial scans are completed.

If an installed program on a system matches the assessment matrix and provided by the method of this invention, a security posture analysis of each matched program on each mapped system will initiate. Once the analysis of a particular program is complete, the method of this invention will continue evaluating the remaining programs that match the assessment matrix until a complete data analysis is captured on a system. This analysis and reporting process can be completed on multiple simultaneous systems at a time. Once the analysis for a group of systems is complete, the data sessions are closed; no residual data remains on the remote systems. The data analysis is captured in a single repository for the entire network or domain. The method of this invention is repeated until the entire network or domain's results have been reported to the repository.

Description of Preferred Embodiment

A particularly useful application of the method and systems of this invention is in the evaluation of STIG compliance. To provide additional understanding, this invention is further described in its application to determining compliance with STIGs. This further description in the context of STIGs is not meant to limit the application of this invention to any specific application and those skilled in the art will appreciate that the additional information provided in this specific context has broader application to the practice of this invention with any SSGS.

Figure 9:
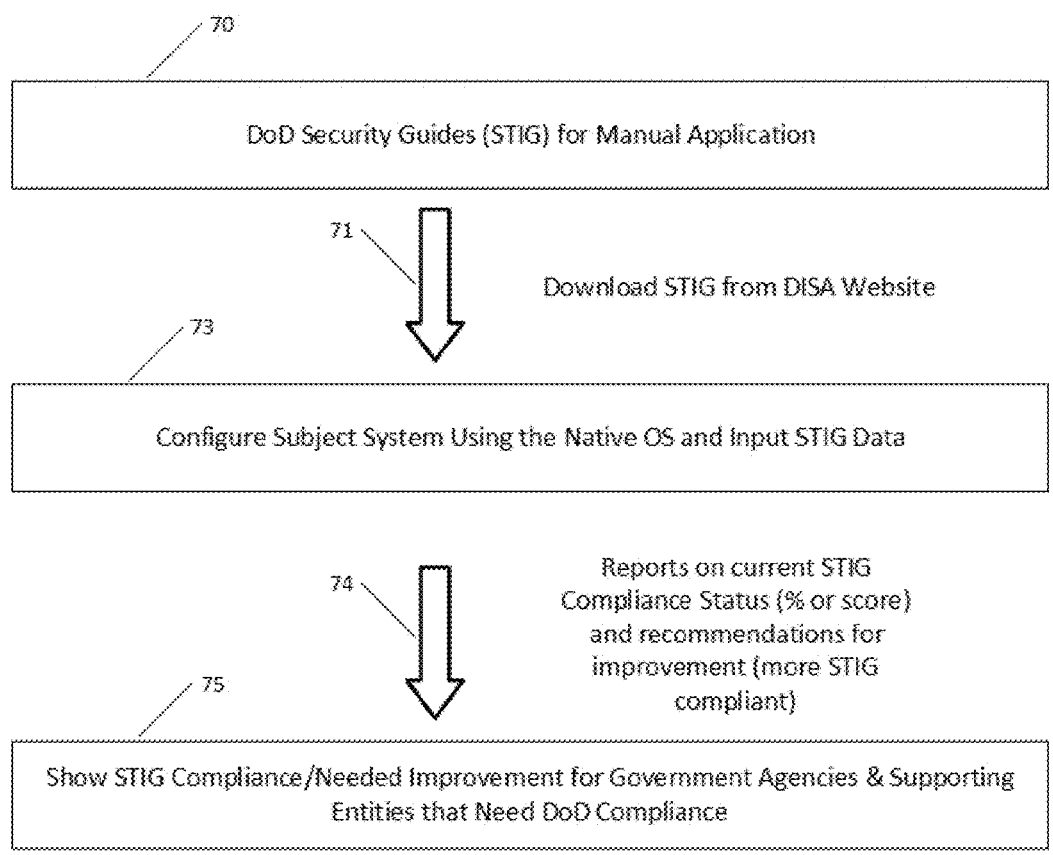
FIG. 9 is a flow diagram showing an overview of the method of this invention applied to checking compliance with an SSGS that consists of a STIG.

Similar to the overview of the method and system as shown in FIG. 1, FIG. 9 captures the basic steps of the invention as it may be applied on its specific application to STIG viewer information from the DISA Website. The method starts with the step of box 70 where the DoD security guidelines as captured in the STIG are obtained. The next step is the download of the STIG via the step indicated by arrow 71 onto the Subject System to configure the Subject System using the native OS and to sequentially or simultaneously input the STIG data in the step outlined by box 73.

This programming to configure the Subject System and provide the SCS is again performed using embedded software that is resident in the computer's memory. This specific example employs a Microsoft® operating system and uses the embedded Windows PowerShell® and WMI as previously described. This programming provides the Subject System with a resident SCS as shown in box 73.

The SCS programmed into the Subject System operates on the SSGS data and provides, via the step shown by step 74, the reports on STIG compliance that includes a % score for compliance and recommendations for improvement.

The final step shown by box 75 is the desired end result of showing STIG compliance or improvements needed for STIG compliance. This final result is sought by those government agencies and the commercial agencies that support the DoD so that they show STIG compliance.

Figure 10:
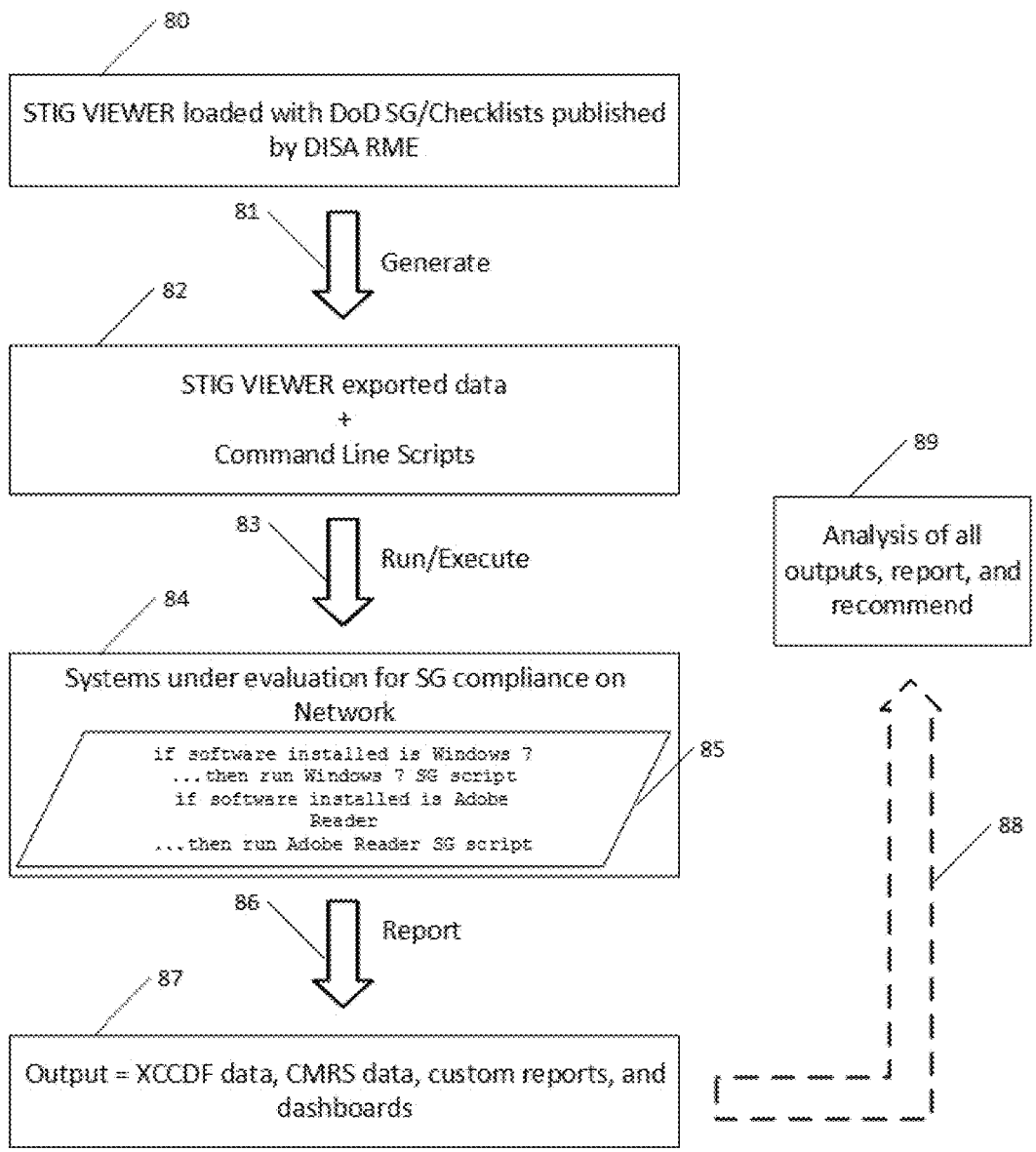
FIG. 10 is a flow diagram showing a series of generalized steps by which the method of this invention may be performed to check compliance with an SSGS that consists of a STIG.

FIG. 10 gives a more complete and detailed logic diagram for a specific application of the method of this invention to STIG compliance. The step identified by the number 80 shows the identification of the Subject System for the STIG status check. Coding input 81 for compliance with a particular SSGS is provided to the Subject System computer for generating the SCS. The SCS is then generated using the native operating system to configure the Subject System into a computer system having the SCS embedded for execution (See box 82.) The compliance data that makes up the SSGS is then input, via a step shown by arrow 83, into the Subject System containing the embedded SCS for execution in the step 84 through representative steps shown in box 86. Processing of this SSGS data with the script generates the compliance status as shown in box 85. The compliance status may include the automated generation of a compliance score. The SCS may also generate tags associated with text material that describes additional security requirements and/or deficiencies.

The method and system may include a further automated step, shown by arrow 86, that transforms the output of the compliance check into other desired formats or reports. Examples include XCCDF data, CMRS data, custom reports and dashboards (See box 87.)

The automated data generated by and containing the evaluation of the Subject System typically undergoes a manual review step indicated by arrow 89. This step can include an additional manual service (see box 89) by those using the method of this invention whereby analysis is performed and recommendations are generated.

The specific type of programming required to generate the SCS and provide a system configured with an embedded SCS will vary with the nature of the SSGS. Such programming will typically require extensive coding of independent and nested decision statements that may lead to further selective script portions of the SCS. Ultimately the coding will develop a set of codes that indicate the security status or condition of the system and may include the aforementioned tags that allow the generation of appropriate textual output.

In this preferred embodiment of the method of this invention the automating of a STIG viewer application has been found to require the writing of relatively little original code. The required script for the typical STIG view application requires on average 5,000 lines of code. Accordingly, the application of the method of this invention greatly improves the procedures for STIG review without the need for large amount of code writing and the burden of keeping large code libraries up to date.

What is claimed is:

1. A method for determining a point in time compliance status of a computer system with a software security guideline set (SSGS) wherein the computer system has a command line shell available through its native operating system, the method comprising:

inputting into the computer system a script input comprising comma separated values (CSVs) that provide data for an evaluation of the computer system's compliance with the SSGS under consideration and coding a series of command lines into a security check script (SCS) retained at least temporarily in the computer system memory using the native operating system of the computer system wherein the SCS performs at least a portion of an automated evaluation of the SSGS under consideration;

generating and executing the SCS using the CSVs to generate a series of condition codes wherein the condition codes include an indication of an open status, a closed status or an undetermined status; and, assembling at least a portion of the condition codes into an output file formatted for at least partial determination of a compliance status of the computer system with the SSGS under consideration.

2. The method of claim 1 wherein the computer system comprises a central processing unit and one or more remote components that communicate with the central processing unit through a wireless interface and least one of the remote component or the central processing unit retains the SCS.

3. The method of claim 2 wherein the central processing unit communicates with one or more remote capabilities.

4. The method of claim 1 wherein the output file provides data suitable to generate at least one of XCCDF data, CMRS data, or xml file.

5. The method of claim 1 wherein the computer system transforms the CSVs for data transfer that is compatible with the command line format.

6. The method of claim 1 wherein the computer system comprises a network of computers and the output file provides an at least partial determination of the compliance status of all the network of computers.

7. The method of claim 6 wherein the computer system comprises an arrangement of multiple components including at least several components from the group consisting of laptops, desktops, other portable devices, servers, and that associated with domain sites.

8. The method of claim 6 wherein the computer system comprises multiple servers.

9. The method of claim 8 wherein the computer system communicates with multiple domains.

10. The method of claim 1 wherein the SSGS comprises a software security implementation guideline (STIG) under the control of the Department of Defense (DoD).

11. The method of claim 1 wherein the SCS is programmed for removal from the Subject System following execution of the SCS.

12. The method of claim 1 wherein the SCS extracts data from Subject System via wireless data transfer.

13. The method of claim 1 wherein the CSVs are processed by the computer system after the coding of the series of command lines into the SCS.

14. The method of claim 1 wherein execution of the SCS generates data for development of a text file that provides user readable information related to the security status of the Subject System.

15. A computer system adapted to provide an indication of its compliance with a software security guideline set (SSGS), the system comprising:

an operating system having a Command Shell;

a series of command lines coded using a native operating system of a computer into a security check script (SCS) that is coded to perform automated evaluation of an SSGS under consideration retained at least temporarily in the computer system;

an input interface configured to receive a file of comma separated values (CSVs) that comprise at least a portion of the SSGS and provide at least a portion of data to evaluate the compliance of the computer system with the SSGS under consideration;

a processor configured to generate and execute the SCS using the CSVs to generate a series of condition codes that indicate an open status, a closed status or an undetermined status; and, an output interface configured to export a set of condition codes suitable for at least partial determination of the compliance status of the computer system with the SSGS under consideration.

16. The computer system of claim 15 wherein the computer system is configured to evaluate its compliance with an SSGS comprised of a software security implementation guideline (STIG) generated by the Defense Information Systems Agency (DISA).

17. The computer system of claim 15 wherein the SCS is programmed to generate an output file of at least one of XCCDF data, CMRS data, or an xml file.

18. The computer system of claim 15 wherein the SCS is coded to transform the CSVs for data transfer that is compatible with the command line format.

19. The computer system of claim 15 wherein the computer system comprises a network of computers and SCS is coded to generate an output file that provides an at least partial determination of the compliance status of all the computers in the network.

* * * * *